United States Patent [19]

Cluff

[11] Patent Number: 5,112,483

[45] Date of Patent: May 12, 1992

[54] SLOW SAND/NANOFILTRATION WATER TREATMENT SYSTEM

[76] Inventor: C. Brent Cluff, 310 W. Camino Fairhaven, Tucson, Ariz. 85704

[21] Appl. No.: 650,291

[22] Filed: Feb. 4, 1991

[51] Int. Cl.$^5$ ................................................ C02F 9/00
[52] U.S. Cl. ..................... 210/223; 210/255; 210/259; 210/266; 210/321.87
[58] Field of Search ............. 210/223, 255, 257.2, 210/259, 266, 287, 317, 318, 321.64, 321.78, 321.79, 321.8, 321.81, 321.87, 321.88, 321.89, 321.9

[56] References Cited

U.S. PATENT DOCUMENTS

| | | | |
|---|---|---|---|
| 4,806,244 | 2/1989 | Guilhem | 210/669 |
| 4,872,991 | 10/1989 | Bartels et al. | 210/651 |
| 4,981,594 | 1/1991 | Jones | 210/257.2 |
| 5,039,416 | 8/1991 | Loew et al. | 210/639 |

Primary Examiner—Ivars Cintins
Attorney, Agent, or Firm—Warren F. B. Lindsley

[57] ABSTRACT

A water treatment device comprising a slow sand filter in fluid flow combination with a nanofilter for water pretreatment purposes. The nanofilter is surrounded by a housing spacedly arranged thereto which housing is capped at each end and axially aligned with and connected to a T-shaped pipe fitting at each end thereof. A pipe is arranged to extend axially through the T-shaped fittings, the caps and the nanofilter which pipe is apertured along that portion thereof in said nanofilter. Water fed from the slow sand filter into one T-shaped fitting is directed inwardly and laterally through the nanofilter with the purified water flowing through the apertures of the pipe with a discarded portion of the water being conducted through the second T-shaped pipe fittings out of the device for disposal purposes.

12 Claims, 4 Drawing Sheets

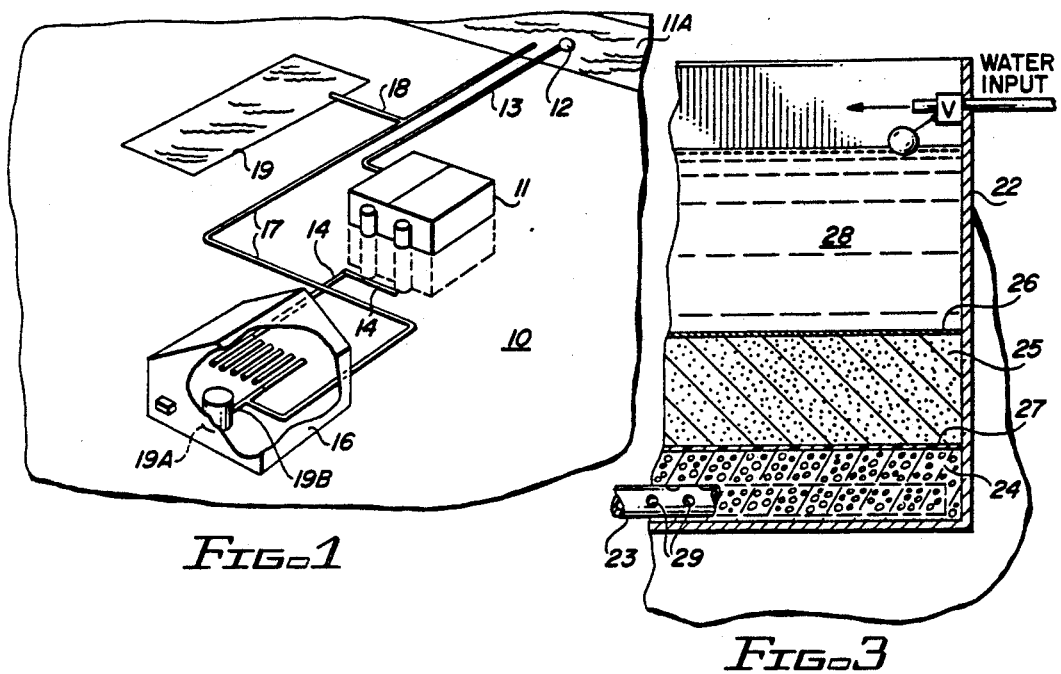
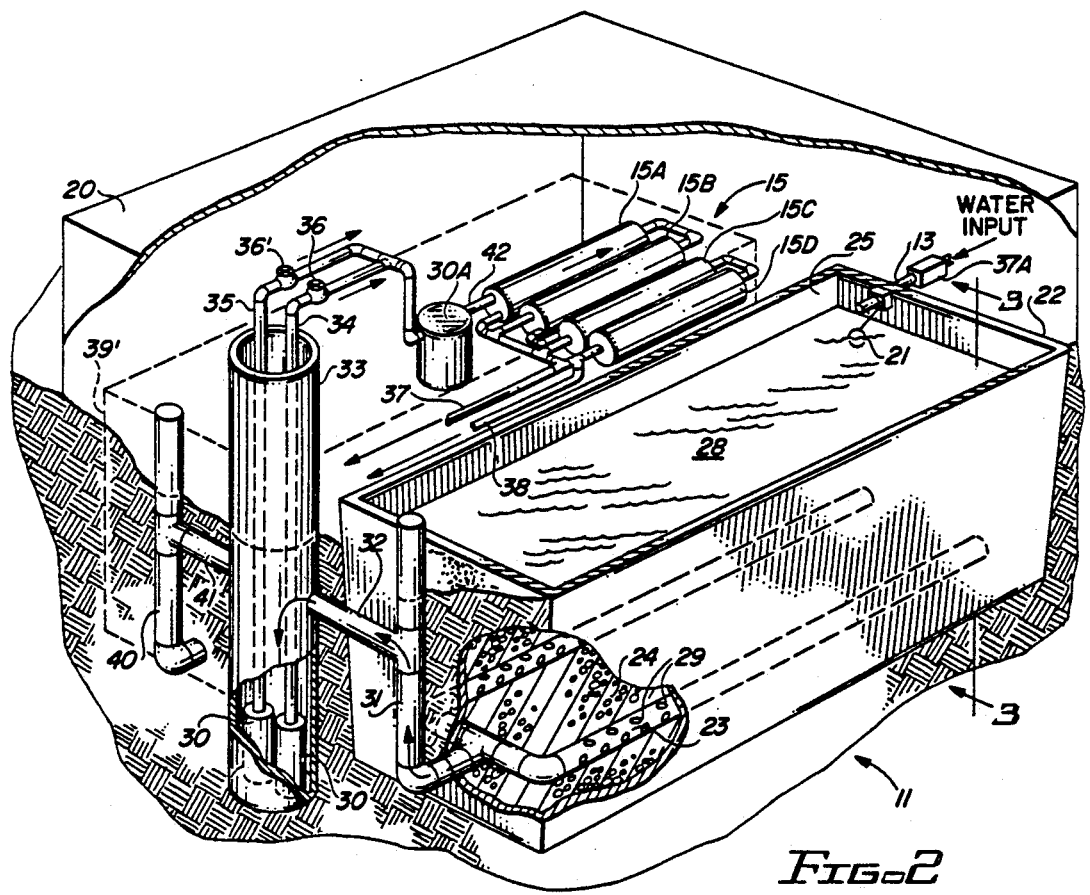

SLOW SAND/NANOFILTRATION WATER TREATMENT SYSTEM

BACKGROUND OF THE INVENTION

This invention relates to water treatment techniques and processes and more particularly to slow sand-/nanofiltration for eliminating organic precursors that are not removed by conventional water treatment plants.

DESCRIPTION OF THE PRIOR ART

Nanofiltration comprises the treatment of water by forcing it through a porous membrane. The water molecules are able to pass through the membrane together with some of the smaller organic and inorganic molecules. The larger organic and inorganic molecules are removed by rejection of the nanofilter. The nanofilters will remove most of the dissolved salinity solids and a large percentage of the dissolved organic matter including trihalomethanes (THM) and organic halogens (TOX) precursors and parasites and essentially all of the bacteria and viruses. The naturally occurring organic, humic and fulvic acids in the water will produce THM and TOX precursors (both are suspected carcinogens) when disinfectants such as chlorine or chloramines are added to the water.

The prefix nano means one thousand millionth or $10^{-9}$. One nanometer is equivalent to 10 angstroms. The NF-70 NANOFILTRATION membranes made by FilmTec, a subsidiary of Dow Chemical Company, will reject all molecular species of 10 angstroms or greater in diameter consistent with a 200 molecular weight cutoff. Rejection of molecular species below a 200 molecular weight is dependent on their size, ionic charge and membrane affinity. This molecular weight cutoff is ideal for eliminating organic precursors that are not removed in conventional water treatment plants. These nanofilters will remove most of the sulfate, calcium and magnesium products in the water and about ½ of the sodium and chloride compounds. Other companies, including Desal, make a similar type of membrane.

Nanofiltration has a higher molecular cutoff than reverse osmosis. The membrane of the nanofilter is coarser and because of this fact, substantially less energy is required to force water through the membrane of the nanofilter.

The system can operate successfully at a pressure of 70 psi and the amount of energy required to operate the filter is about the same as pumping water from a well with a static water level 160 feet below the surface. Higher pressures can be used if necessary to increase the flow and provide even better quality water. The gallons per square foot passing through a unit area of the membrane of the nanofilter can be two to three times that of a reverse osmosis filter. This fact reduces capital costs and the combination of reduced capital cost and reduced energy cost make the nanofilter method less expensive than a reverse osmosis filter and brings the costs down to reasonable levels. Slow or gravity sand filtration have been used for over a century, particularly in Europe, to provide both filtration and biological treatment within the same system.

DESCRIPTION OF THE PRIOR ART

No known prior art on the apparatus and methods disclosed are known.

SUMMARY OF THE INVENTION

In accordance with the invention claimed, a new and improved water filtration system is disclosed employing novel nanofiltration structure and uses thereof.

It is, therefore, one object of this invention to provide a new and improved water filtration system.

Another object of this invention is to disclose a new and improved water filtration apparatus employing new nanofiltration techniques.

A further object of this invention is to use a slow sand filter in combination with nanofilters to obtain potable water of a higher purity than possible with conventional water treatment plants.

A still further object of this invention is to provide a new nanofilter assembly and method of operation in a sequential arrangement in combination with a slow sand filter.

A still further object of this invention is to provide a new and improved cost effective water treatment system using nanofiltration in combination with a slow sand prefiltering arrangement.

A still further object of this invention is to use the filtration and biological treatment inherent in the slow sand filter as a pretreatment to enhance and reduce fouling of nanofiltration membranes. In the past, without the use of slow sand filtration as a pretreatment, it has been extremely difficult to economically treat surface water with reverse osmosis or nanofiltration. With the pretreatment of the water with slow sand filtration, the use of nanofiltration on surface water becomes practical.

Further objects and advantages of this invention will become apparent as the following description proceeds, and the features of novelty which characterize the invention will be pointed out with particularity in the claims annexed to and forming a part of this specification.

BRIEF DESCRIPTION OF THE DRAWINGS

The present invention may be more readily described by reference to the accompanying drawings in which:

FIG. 1 discloses a diagrammatic illustration of the use of a slow sand filter in combination with a subsequent nanofiltering apparatus and embodying the invention;

FIG. 2 discloses a modification of the structure shown in FIG. 1 including more details of the slow sand filter and nanofiltering apparatus under one roof;

FIG. 3 is a cross sectional view of FIG. 2 taken along the line 3—3;

DESCRIPTION OF THE PREFERRED EMBODIMENT

Figure 4:
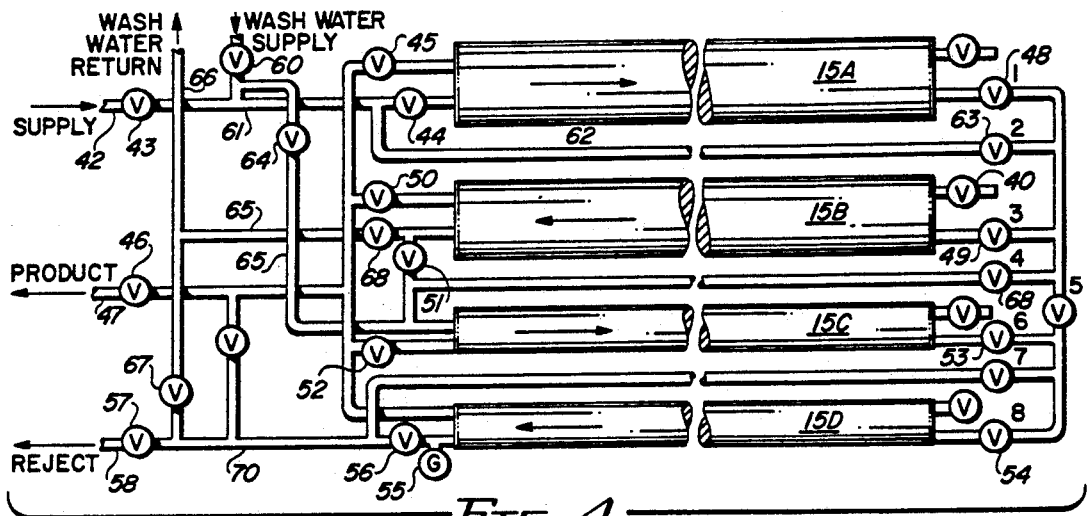
FIG. 4 is a diagrammatic illustration of a nanofilter series connection employing different size nanofilters including different types of nanofilter membranes.

Referring more particularly to the drawings by characters of reference, FIG. 1 discloses a diagrammatic illustration of a water filtration system 10 employing a slow sand or gravity filter 11 furnished with water from any suitable source such as, for example, a canal 11A by pump 12 through a pipe line 13, the filtered discharge of which is conducted through a pipe line 14 to a group of nanofilters 15 housed in a building 16. The rejected discharge of the nanofilter arrangement is either conducted back through pipe line 17 to either canal 11A or through pipe line 18 to any other suitable place such as pond 19 with the purified water stored in a suitable well 19A or tank 19A or used directly by a user from line 19B.

The source of treatable water may include above or below ground water, or previously used water.

FIG. 2 is a more detailed illustration of the water filtration system shown in FIG. 1 wherein the slow sand filter and the nanofilters are housed in a common building 20.

As shown, the water input to slow sand filter 11 is through pipeline 13 and may be controlled by a float valve 21. Although the slow sand filter 11 is shown in a tank 22, it may comprise a ground level area or pond which can be scraped by a bulldozer blade and still fall within the scope of this invention.

The tank may comprise an apertured drain pipe 23 of any suitable configuration, such as the U-shaped configuration shown in FIGS. 2 and 3 which is embedded in gravel 24 and covered by sand 25. Sand 25 may comprise one or more layers of different grade material covered by plastic filter fabric screen or mat 26. The sand 25 not only serves to physically filter the sediment and other impurities but also provides a conducive environment for micro-organisms that further purifies the water, removing some dissolved organic matter. This biological treatment is not available in rapid sand pressurized filtration systems used with nanofiltration in the past. The sand may comprise any suitable material which is positioned over a selected gravel bed 24 and separated therefrom by a suitable mat such as plastic screen 27. The remaining top portion of tank 22 is covered with water 28.

It should be noted that the top level of a slow sand filter is important to the efficiency and economy of the filter. It is this portion of the sand bed that is contaminated and must be periodically removed after removal of screen 26. The removal technique is important and as disclosed herein may be skimmed off by a tractor blade that can be guided by sensors or a laser beam. With the removal of approximately one inch of the top layer of sand, the remaining sand is approximately 95 to 100 percent contamination free. Removing the top layer of sand is fast since by volume very little is removed from the filter bed. This process can be repeated many times until the sand of the filter bed is depleted at which time the sand that has been removed from the filter bed must be replaced.

As noted, the drain pipe 23 is provided with a plurality of apertures 29 through which the water 28 flows after being filtered and is conducted under suction of pump 30 through pipe lines 31 and 32 to a water storage well 33. This well is a temporary storage for water pumped from sand filter 11. Water is drawn by one of the submersible pumps 30 from this well or associated slow sand filter 39 through pipe lines 34 or 35, valves 36 or 36', a 5 micron cartridge or bag filter 30A, to a sequential arrangement of nanofilters 15 and then to a clean and pure water discharged pipe line 37 with the rejected water from nanofilters 15 being discharged through pipe line 38 to a given site for a suitable use. Other types of pumping arrangement could be used. Further, the inlet water to the slow sand though pipe line 13 may be fed through a catalytic and/or magnetic water conditioner 37A before use to reduce magnesium and calcium scaling in the nanofilters without the addition of chemicals, if so desired.

As shown in FIG. 2, the storage well can be used for one or more slow sand filter beds as evident from the dash line illustration of the second slow sand filter 39 which feeds its filtered water through pipe lines 40, 41 into well 33 and through pipe line 35 and valve 36' to micron filter 30A and nanofilters 15 as previously explained.

Figure 5:
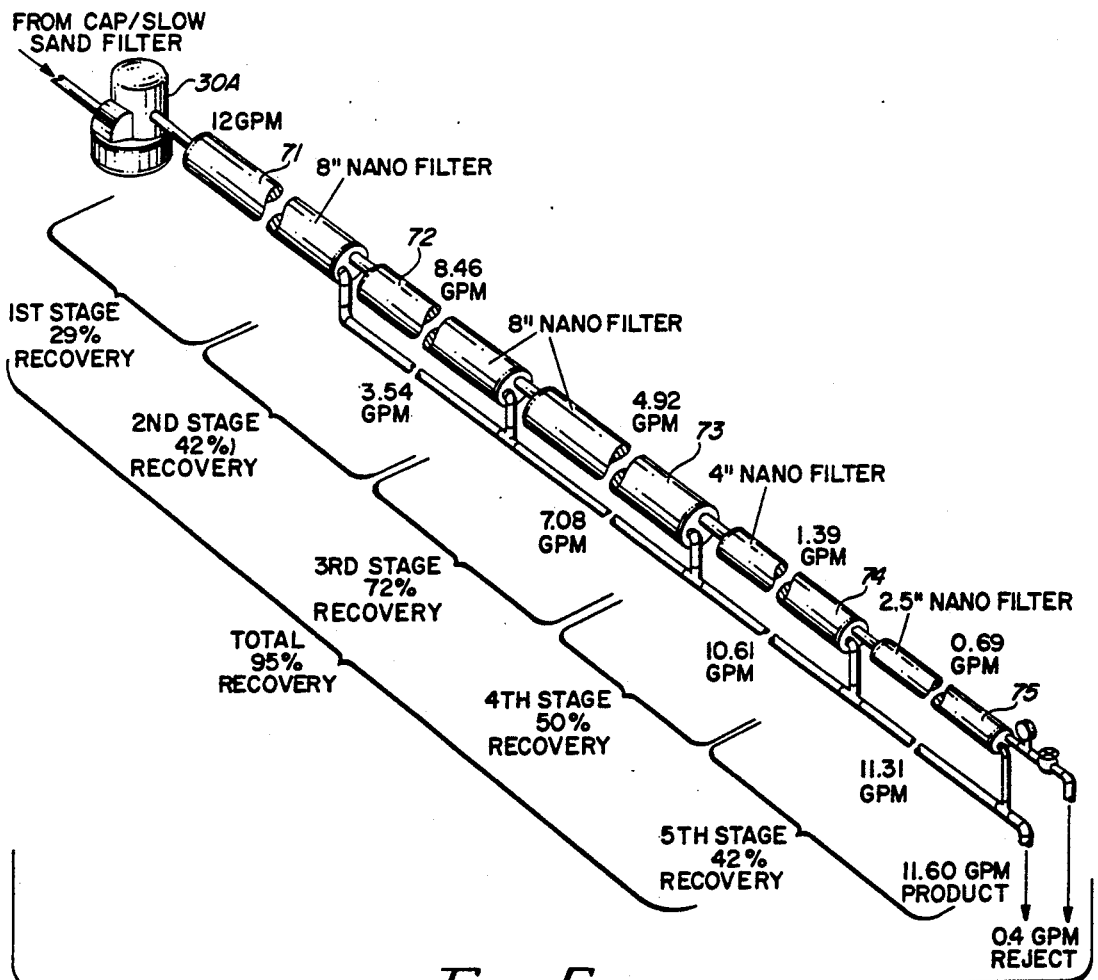
FIG. 5 is a diagrammatic illustration of the slow sand filter in series arrangement with different types of nanofilters.

FIGS. 4 and 5 illustrate, for example, a series connection of a number of nanofilters 15 of various sizes connected together.

In FIG. 4, a series arrangement of nanofilters 15A, 15B, 15C and 15D is shown with water 28 from slow sand filter 11 being supplied through cartridge filter 30A, pipe line 42 and valves 43 and 44 to the interior of nanofilters 15A where it is filtered by a variety of screening material with a first portion therein being filtered and discharged through valves 45 and 46 to a product line 47.

A part of water 28 from filter 15A is conducted through valves 48 and 49 to the entrance of filter 15B where a second portion of the water is filtered and discharged through valves 50 and 46 to product line 47.

A part of water 28 from filter 15B is conducted through valve 51 and into the left end of filter 15C where a third portion of water 28 is filtered and discharged through valves 52 and 46 into product line 47 with remaining water 28 passing through valves 53 and 54 before it enters the right end of filter 15D.

A fourth portion of water 28 filtered in filter 15D is conducted out of the left end of filter 15D through valve 46 and into product line 47. The remainder of water 28 is sensed by a pressure gauge 55 and passes through valves 56 and 57 to a water reject line 58.

In order to clean the filters a wash water supply is conducted through valve 60, pipe line 61, valve 44 and filter 15A and simultaneously through pipe line 62, valve 63, valve 49, filter 15B, valve 68, pipe line 65 to a water return site 66 when valve 67 is closed. Further wash water is transmitted through valve 68, pipe line 69, filter 15C, valve 53, valve 54, filter 15D, gauge 55, valve 56, pipe line 70, valve 67 to site 66 or through valve 57 to reject line 58.

FIG. 5 illustrates a series arrangement of a plurality of different size filters 71-75 which receive water 28 from slow sand filter 11 through cartridge micro filter 30A. This water is transmitted through the series arrangement of the filters with a portion from each filter being filtered off as purified water. An important feature of this invention is that nanofilter elements having increasing salt rejection functions are used in addition to decreasing size features. As the reject water increases in salt concentration tighter membranes that have a higher salt rejection capability are used. The Desal company's SH 74 product has a higher salt rejection feature than the Desal DK 73 product. Similarly, the Desal product SG 75 has an even higher salt rejection than its SH 74 product.

For example, the eight inch nanofilter 71 receiving water through the 5 Micron filter 30A at the rate of twelve gallons per minute discharges 3.54 gallons per minute of purified water with filter 72 discharging 7.08 gallons per minute. Filters 73, 74 and 75 discharge 10.61 gallons per minute, 11.31 gallons per minute and 11.60 gallons per minute, respectively.

Decreasing sizes are used as the flow diminishes due to removal of product water to maintain appropriate flow velocity. Thus, nanofilter 74 is smaller in diameter than nanofilter 73 and nanofilter 75 is smaller in diameter than nanofilter 74. These decreasing sizes can also be achieved using a decreasing number of vessels in each stage.

The volume of water 28 flowing through the series connection of the filters drops through each of the filters as indicated by the drawing finally discharging through nozzle 76 to a reject site at about 0.46 gallons per minute.

Figure 6:
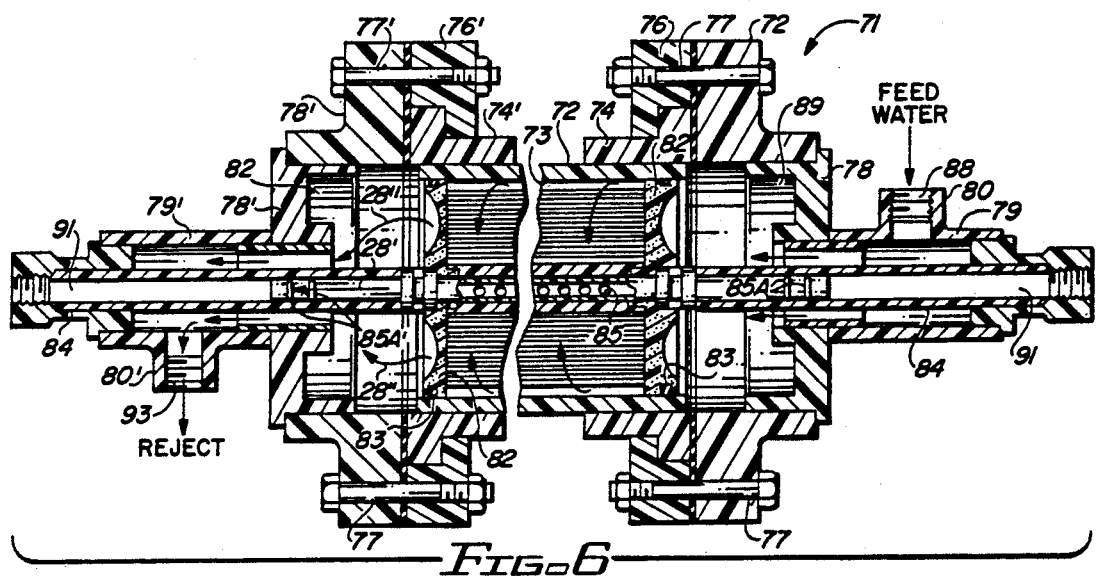
FIG. 6 is a cross sectional view of a particular nanofilter.

FIG. 6 is a cutaway view of a typical nanofilter 71 comprising a housing 72 enclosing a cartridge 73. Although these filters are manufactured in various sizes, as heretofore explained, FIG. 6 is typical of one design configuration.

Housing 72 comprises a cylindrical configuration that encloses a nanofilter element 73. Housing 72 is provided at each end with an annular ring forming flanges 74, 74'. To these flanges are secured collars 75, 75'held there against by inboard rings 76, 76' and bolts 77, 77', as shown. The ends of the nanofilter structure are provided with apertured flange 78, 78', sealed thereon for receiving axially thereof T-shaped connectors or couplings 79, 79', the internally threaded T-outlets 80, 80' of which forms water inlets and water outlets, respectively.

Except for cartridge 73, all of the parts forming the nanofilter comprise plastic pipe fittings and couplings found in the marketplace. The only machining that is needed on standard fittings is to cut the seating ring out of bushings 79 and 79' so that pipes 91 and 91' can pass completely through said bushing. The other machining needed is to slightly enlarge pipes 91 and 91' so that a standard insert 85, 85' equipped with O-rings 85A, 85A' can slip inside to seal the product water from the brine water.

Figure 7:
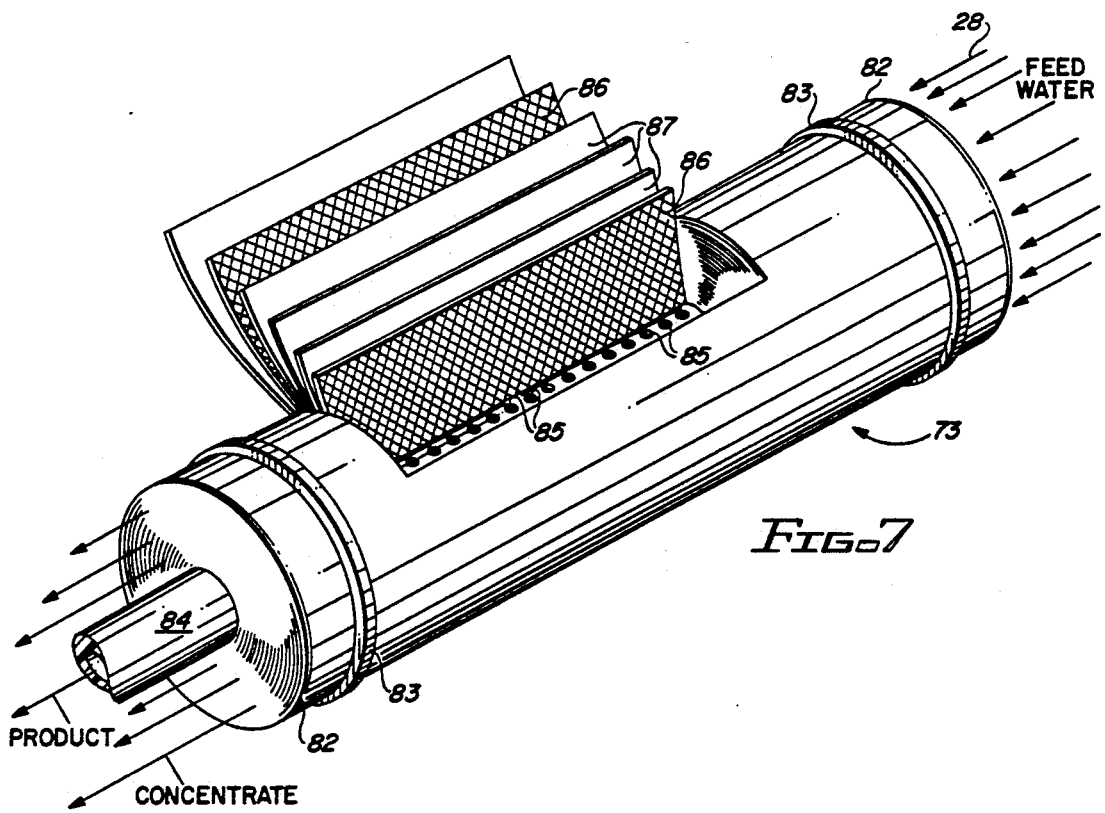
FIG. 7 is a perspective view of a nanofilter with a cutaway and exploded view of the various wrappings of the filter.

FIG. 7 discloses a cutaway view of the internal characteristics of cartridge 73 with radial views of its elements. As shown, each end of cartridge 73 is provided with a combination cap and annular filter 82 the outer diameter of which is sealed in the inner diameter of housing 72 by O-rings 83 formed at the entrance and exit ends of cartridge 73. Cartridge 73 comprises a pipe 84 comprising a plurality of parts extending axially therethrough the inner portion of which is provided with a plurality of apertures 85 axially positioned as shown, to provide passageways for receiving water flowing inwardly through the various spirally positioned membrane elements 86 and spacers 87.

As mentioned heretofore, the nanofilters are manufactured and sold in the marketplace by FilmTec, a subsidiary of Dow Chemical Company as well as other companies and per se do not form a part of this invention. This invention is directed to the nanofilter in an assembly formed by readily available pipe fittings alone and in combination with a slow sand filter.

With reference to FIG. 6, water from the slow sand filter is directed through water feed inlet 88 into a manifold 89 where it is fed under pressure through a porous end cap or annular filter 82 and along the outer periphery of cartridge 73 and through the various spacers 87 and membrane elements 86 thereof. This water percolates through the various membrane elements forming the cartridge until a part of the water filters into the apertured pipe 84 and is transmitted under pressure to an outlet 91 for use as purified water 28A. The portion of the water 28B that is screened out by the various membrane elements 86 is fed into manifold 92 and through the outlet 91 formed by T-shaped coupling 79' and suitably disposed of.

Figure 8:
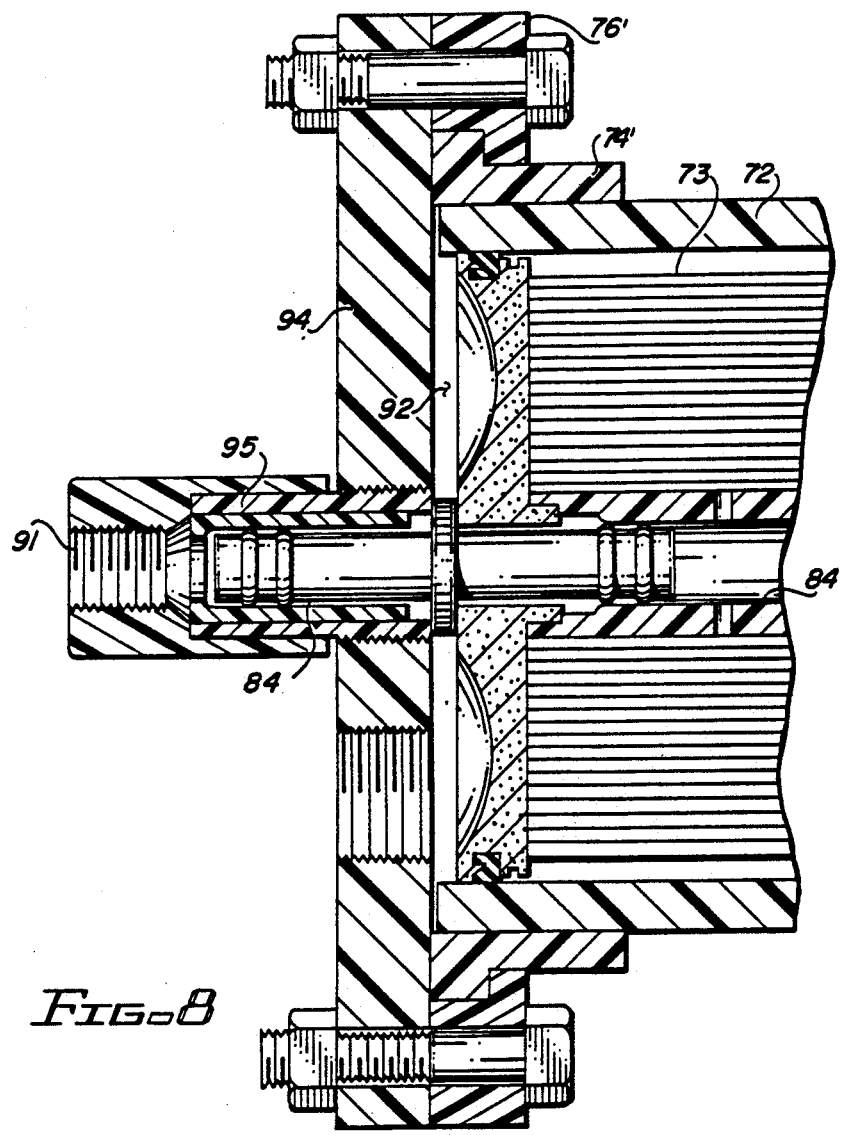
FIGS. 8 and 9 are cross sectional views of two modifications of the nanofilter shown in FIG. 6.

FIG. 8 illustrates a further modification of the nanofilter comprising housing 72 wherein like parts are given the same reference characters. In this illustration, a cap 94 threadedly mounted on a threaded end of a pipe extension 95 or pipe 84 is clamped to ring 76'.

Figure 9:
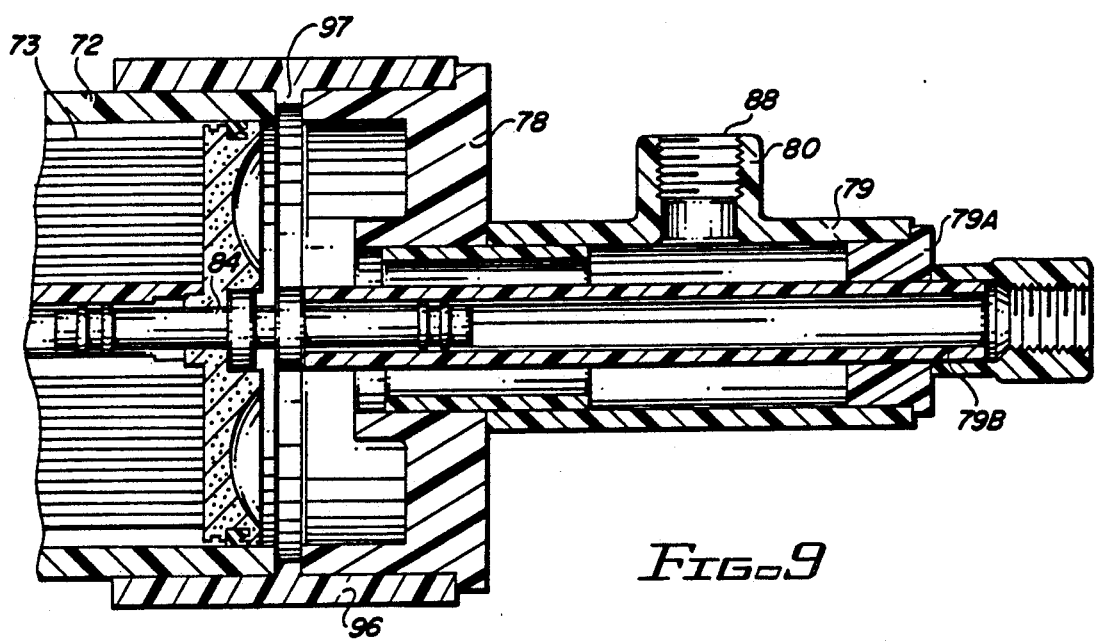

FIG. 9 shows a further modification of the manifold assemblies shown in FIGS. 6 and 8 wherein T-shaped coupling 79 is secured, as by cementing, to the end of cartridge 73 by a collar 96. Collar 96 is provided with an inwardly extending flange 97 which aids in the alignment of the parts of this nanofilter assembly. Again in this modification the only machining necessary is to ream the reducing bushing 79A so that the pipe 79B can pass completely through the bushing. The other end of the pipe is reamed out slightly so that insert 84 can fit inside to separate the brine from the product water. The insert 84 is included when the cartridge element is purchased.

Although a few illustrations of the various nanofilter assemblies formed by readily available PVC plastic fittings are shown and described, many other combinations may be assembled from these fittings and still fall within the scope of this invention. Accordingly, it will be apparent to those skilled in the art that various changes and modifications may be made therein without departing from the spirit of the invention or from the scope of the appended claims.

What is claimed is:
1. A water filtration device comprising:
a cylindrically formed nanofilter formed of a plurality of layers of membrane elements separated by spacer elements and having a cylindrical opening extending axially therethrough,
an elongated housing surrounding said manifold in spaced relationship thereto,
a pair of axially aligned caps one attached to each end of said housing,
each of the caps having an aperture extending axially therethrough and defining between said cap and the associated ends of said housing first and second manifolds,
a pair of T-shaped pipe fittings fastened one to each of said caps and extending outwardly and axially thereof for providing a water inlet port and a water outlet port respectively,
each of said T-shaped pipe fittings being spacedly arranged to said pipe and sealed thereto at its outer ends for forming a passageway around said pipe axially thereof, and
a pipe extending axially through said T-shaped pipe fittings, said caps and said nanofilter and being provided with a plurality of apertures spacedly arranged along the length of the portion of said pipe within said nanofilter,
means for causing water entering the T of one of said T-shaped fittings to flow axially thereof around said pipe into a first one of the manifolds and later- ally inwardly through said nanofilter with a purified portion of said water flowing through said apertures and into said pipe and outwardly of one end thereof and a reject portion of said water flowing out of said nanofilter longitudinally thereof and into said second manifold and from there through the other of said T-shaped pipe fittings.

2. The water filtration device set forth in claim 1 wherein:
said pipe, said first and second caps and said pair of T-shaped pipe fittings are formed of a plastic material.

3. The water filtration device set forth in claim 1 wherein:
said nanofilter comprises a plurality of spaced and coaxially arranged membrane elements.

4. The water filtration device set forth in claim 1 wherein:
said nanofilter comprises a plurality of coaxially aligned spirally arranged membrane elements separated by a plurality of spacer elements.

5. The water filtration device set forth in claim 1 wherein:
said end caps are clamped to each end of said housing.

6. The water filtration device set forth in claim 1 wherein:
said pair of T-shaped pipe fittings are coaxially aligned with said pipe and spaced thereof for conducting water around one end of said pipe into a first of said manifolds, through said nanofilter and into a second of said manifolds with a first portion of the water flowing into said pipe for discharge therefrom and a second portion of the water flowing around the other end of said pipe and outward of said housing.

7. The water filtration device set forth in claim 1 in further combination with:
a gravity feed sand filter for both filtering the water and providing biological treatment before it enters said first T-shaped pipe fitting.

8. The water filtration device set forth in claim 7 in further combination with:
a water conditioner connected to receive said purified portion of said water flowing out of said filter before entering said T-shaped pipe fitting.

9. The water filtration device set forth in claim 8 wherein:
the water conditioner comprises a catalytic device.

10. The water filtration device set forth in claim 8 wherein:
the water conditioner comprises a magnetic device.

11. The water filtration device set forth in claim 1 in further combination with:
more than one nanofilter arranged in a cascading sequence wherein each subsequent nanofilter has a higher salt rejection capability.

12. The water filtration device set forth in claim 1 in further combination with:
more than one nanofilter arranged in a cascading sequence wherein one or more of the subsequent nanofilters has a higher salt rejection capability.

* * * * *